US010029661B2

(12) United States Patent
Isono et al.

(10) Patent No.: US 10,029,661 B2
(45) Date of Patent: Jul. 24, 2018

(54) CYLINDER DEVICE

(71) Applicants: Hiroshi Isono, Mishima (JP); Akihiko Miwa, Anjyo (JP)

(72) Inventors: Hiroshi Isono, Mishima (JP); Akihiko Miwa, Anjyo (JP)

(73) Assignees: TOYOTA JIDOSHA KABUSHIKI KAISHA, Toyota-shi (JP); ADVICS CO., LTD., Kariya (JP)

( * ) Notice: Subject to any disclaimer, the term of this patent is extended or adjusted under 35 U.S.C. 154(b) by 613 days.

(21) Appl. No.: 14/402,855

(22) PCT Filed: May 7, 2013

(86) PCT No.: PCT/IB2013/000861
§ 371 (c)(1),
(2) Date: Nov. 21, 2014

(87) PCT Pub. No.: WO2013/175279
PCT Pub. Date: Nov. 28, 2013

(65) Prior Publication Data
US 2015/0175141 A1 Jun. 25, 2015

(30) Foreign Application Priority Data
May 22, 2012 (JP) .................................. 2012-116364

(51) Int. Cl.
*B60T 11/16* (2006.01)
*B60T 7/04* (2006.01)
(Continued)

(52) U.S. Cl.
CPC .............. *B60T 11/16* (2013.01); *B60T 7/042* (2013.01); *B60T 8/3265* (2013.01); *B60T 8/4077* (2013.01); *B60T 13/146* (2013.01)

(58) Field of Classification Search
CPC .......... B60T 7/042; B60T 8/441; B60T 8/446; B60T 8/3265; B60T 8/4077; B60T 13/146
See application file for complete search history.

(56) References Cited

U.S. PATENT DOCUMENTS 4,641,891 A * 2/1987 Belart .................. B60T 13/146
188/345
5,669,673 A * 9/1997 Reuter .................. B60T 8/4013
188/358

(Continued)

FOREIGN PATENT DOCUMENTS

DE 10 2010 038 328 2/2011
EP 1 975 025 10/2008

(Continued)

OTHER PUBLICATIONS

International Search Report dated Oct. 25, 2013 in PCT/IB13/000861 Filed May 7, 2013.

*Primary Examiner* — Thomas E Lazo
*Assistant Examiner* — Michael Quandt
(74) *Attorney, Agent, or Firm* — Oblon, McClelland, Maier & Neustadt, L.L.P.

(57) ABSTRACT

A recess is formed in a rear portion of a pressurizing piston, and a small-diameter rod is formed in a front portion of an input piston. A sleeve is disposed inside the recess, and the small-diameter rod is liquid-tightly and slidably fitted to the sleeve. A space between the small-diameter rod and the recess serves as a volume chamber, which is held in communication with a reservoir. The input piston and the pressurizing piston are slidably fitted to each other via the sleeve. Therefore, the generation of a frictional force between the input piston and the pressurizing piston can be made unlikely, and the pressurizing piston can be favorably prevented from advancing as the input piston advances.

13 Claims, 3 Drawing Sheets

(51) Int. Cl.
*B60T 8/32* (2006.01)
*B60T 8/40* (2006.01)
*B60T 13/14* (2006.01)

(56) References Cited

U.S. PATENT DOCUMENTS

| | | | |
|---|---|---|---|
| 6,196,641 B1 * | 3/2001 | Oka | ............ B60T 8/3275 303/10 |
| 2008/0236962 A1 | 10/2008 | Suzuki et al. | |
| 2009/0179485 A1 | 7/2009 | Yang | |
| 2013/0020858 A1 | 1/2013 | Maki et al. | |
| 2013/0318964 A1 | 12/2013 | Isono | |

FOREIGN PATENT DOCUMENTS

| | | |
|---|---|---|
| JP | 11-198796 A | 7/1999 |
| JP | 11-240440 A | 9/1999 |
| WO | 2011 125757 | 10/2011 |
| WO | 2012 114510 | 8/2012 |

\* cited by examiner

CYLINDER DEVICE

BACKGROUND OF THE INVENTION

1. Field of the Invention

The invention relates to a cylinder device for a hydraulic brake system that is provided in a vehicle.

2. Description of Related Art

In US Patent Application Publication No. 2009/0179485, there is described a cylinder device. This cylinder device includes (a) a housing, (b) a first and second pressurizing pistons, (c) a first and second front pressurizing chambers, (d) a control chamber, (e) a control piston, (f) an input piston (a pressure member), (g) a pedal simulator piston, (h) a rod, (i) a simulator piston, and (j) a first and second springs. The pressurizing pistons are liquid-tightly and slidably fitted to the housing. The front pressurizing chambers are provided in front of the pressurizing pistons, and are connected to wheel cylinders respectively. The control chamber is provided behind the first pressurizing piston, and is connected to a hydraulic control device. The control piston is provided in a rear portion of the first pressurizing piston, receives a hydraulic pressure in the control chamber, and transmits a pressure to the pressurizing pistons. The input piston is coupled to a brake pedal. The pedal simulator piston is disposed behind the control chamber, and is restrained from retreating. The rod is extended backward from the control piston, penetrates the pedal simulator piston, and is slidably fitted to a recess that is provided in a front portion of the input piston. The simulator piston is disposed between the input piston and the pedal simulator piston. The first spring is provided between the simulator piston and the pedal simulator piston, and the second spring is provided between the simulator piston and the input piston. In this cylinder device, when the hydraulic pressure controlled by the hydraulic control device is supplied to the control chamber, the pressurizing pistons are advanced, and a hydraulic pressure is generated in each of the front pressurizing chambers and supplied to a corresponding one of the wheel cylinders. Besides, the input piston is advanced as the brake pedal is depressed, but the rod advances as the control piston advances. Therefore, a gap for the recess is ensured, and the input piston is permitted to move relatively to the first pressurizing piston. In the case where no control pressure is supplied to the control chamber, the input piston is advanced through depression of the brake pedal, and the pressurizing pistons are advanced via the rod. Besides, the pedal simulator piston is advanced to come into abutment on the control piston, and the first pressurizing piston is advanced.

SUMMARY OF THE INVENTION

The invention provides a cylinder device having an input piston and a pressurizing piston that can move relatively to each other, for example, a cylinder device that reduces the influence of movements of an input piston on a pressurizing piston in the case where the input piston and the pressurizing piston are moved relatively to each other.

In a cylinder device according to an aspect of the invention, a reaction force chamber is provided between the input piston and the housing, and a volume chamber is provided between the input piston and the pressurizing piston and connected to one of a low-pressure source and an atmosphere. Besides, a recess is provided in one of the pressurizing piston and the input piston, and an axial rod portion is provided in the other. Inside the recess, the recess and the axial rod portion are slidably fitted to each other in at least one of a liquid-tight state and an air-tight state, via a sleeve. (a) If no sleeve is provided between a tube portion forming the recess and the axial rod portion (between the pressurizing piston and the input piston), for example, if the tube portion forming the recess and the axial rod portion are directly and liquid-tightly or air-tightly slidably fitted to each other, the pressurizing piston may be advanced as the input piston advances, due to a frictional force generated between the tube portion and the axial rod portion. In contrast, if the sleeve is interposed between the tube portion forming the recess and the axial rod portion, the pressurizing piston can be restrained from advancing as the input piston advances as a result of a frictional force between the tube portion and the axial rod portion, and the accuracy in controlling the hydraulic pressure in a front pressurizing chamber can be enhanced. (b) If a reaction force chamber is provided between the input piston and the pressurizing piston (including a case where the volume chamber also functions as the reaction force chamber), it is necessary to provide an advance prevention mechanism that prevents the pressurizing piston from advancing as a result of an advancing force that is applied to the input piston. Besides, even if the advance prevention mechanism is provided, the pressurizing piston may be advanced as a result of an advancing force that is applied to the input piston, and it is difficult to favorably apply a reaction force corresponding to a brake operation force to a brake operation member. In contrast, if the reaction force chamber is provided between the input piston and the housing and the volume chamber is connected to one of the low-pressure source and the atmosphere, the pressurizing piston can be favorably prevented from advancing as a result of an advancing force that is applied to the input piston. Thus, there is no need to provide the advance prevention mechanism, and the degree of freedom in design can be enhanced. Besides, a force corresponding to a brake operation force can be applied to the brake operation member as a reaction force, and the feeling of operation can be improved. (c) If the volume chamber is formed between a rear end face of the pressurizing piston and a front end face of the input piston, the total length of the cylinder device becomes long. In contrast, if the axial rod portion of one of the pressurizing piston and the input piston is located inside the recess of the other and the volume chamber is formed therebetween, the total length of the cylinder device can be made short.

(1) A cylinder device includes a housing, a pressurizing piston, an input piston, a front pressurizing chamber, a back chamber, and a reaction force chamber. The pressurizing piston is liquid-tightly and slidably fitted to the housing. The input piston is disposed coaxially with the pressurizing piston and linked with a brake operation member that is operable by a driver. The front pressurizing chamber is provided in front of the pressurizing piston and connected to a brake cylinder. The back chamber is provided behind the pressurizing piston and connected to an output hydraulic control device that can control an output hydraulic pressure through electric control. The reaction force chamber is provided between the input piston and the housing located in front of the input piston, and an operation reaction force receiving face that receives a force corresponding to an operation force applied to the brake operation member of the input piston is opposed to the reaction force chamber. The cylinder device is characterized in that one of the pressurizing piston and the input piston includes a recess that opens toward the other, that the housing includes a generally tubular sleeve that is at least partially located inside the recess, that the other of the pressurizing piston and the input piston includes an axial rod portion that is slidably fitted to the sleeve in at least one of a liquid-tight state and a air-tight state inside the recess, and that a space between the axial rod portion and a bottom of the recess serves as a volume chamber whose volume can change in accordance with relative movements between the input piston and the pressurizing piston and which is connected to a low-pressure source or an atmosphere. The sleeve is a component of the housing, and is a member that is restrained from moving in the axial direction (e.g., a fixed member). The sleeve can assume, for example, a cylindrical shape having openings at both ends thereof in the axial direction respectively. In that case, a bottom of the recess and an end face of the axial rod portion are opposed to each other, and the space therebetween serves as the volume chamber. At least one of the liquid-tight state and the air-tight state between the axial rod portion and the sleeve is a state in which the amount of fluid leaking out from therebetween is very small. Besides, in the case where the axial rod portion is fitted to the sleeve in at least one of the liquid-tight state and the air-tight state, a seal is often provided between the axial rod portion and the sleeve. However, it is not indispensable to provide a seal. Even if no seal is provided, a state in which the amount of fluid leaking out from between the axial rod portion and the sleeve is very small can be realized through, for example, high-accuracy working. The low-pressure source is a tank in which fluid (liquid or gas) is accommodated, and the pressure of the accommodated fluid is often approximately equal to the atmospheric pressure.

(2) The volume chamber may be constantly held in communication with either the low-pressure source or the atmosphere. For example, the volume chamber and the low-pressure source or the atmosphere may be directly connected to each other. In other words, the volume chamber and the low-pressure source or the atmosphere may be connected to each other without an on-off valve or the like provided therebetween. If an on-off valve is provided between the volume chamber and the low-pressure source or the atmosphere, the volume chamber and the low-pressure source or the atmosphere can also be controlled to be brought into communication with each other or shut off from each other. However, if the volume chamber and the low-pressure source or the atmosphere are constantly held in communication with each other without an on-off valve or the like provided therebetween, structural simplification and cost reduction can be achieved. Incidentally, each of the volume chamber and the reaction force chamber may be a fluid chamber in which fluid (which may be either liquid or gas) is accommodated, and each of the front pressurizing chamber and the back chamber may be a liquid chamber in which hydraulic fluid as liquid is accommodated.

(3) The recess may be provided in a rear portion of the pressurizing piston in a rearward opening state. A front portion of the input piston may be provided with a small-diameter portion as the axial rod portion. An intermediate portion of the input piston may be provided with a large-diameter portion that is larger in diameter than the small-diameter portion. A front end face of a step portion between the small-diameter portion and the large-diameter portion of the input piston may serve as the operation reaction force receiving face. The recess may be provided in the rear portion of the pressurizing piston, and the axial rod portion may be provided in the front portion of the input piston. The input piston may assume a stepped shape, the small-diameter portion (the axial rod portion) may be opposed to the pressurizing piston, and the step portion between the small-diameter portion and the large-diameter portion may be opposed to the housing.

(4) The tube portion forming the recess of the pressurizing piston may be slidably fitted to the outside of the sleeve in at least one of a liquid-tight state and an air-tight state, and may be liquid-tightly and slidably fitted to the housing. Also, the region in the recess of the pressurizing piston that is located behind the rear end face of the tube portion may serve as the back chamber. The volume chamber and the back chamber are shut off from each other in at least one of a liquid-tight state and an air-tight state. An output hydraulic control device is connected to the back chamber. The volume chamber is held in communication with the low-pressure source or the atmosphere. Besides, the volume chamber and the reaction force chamber are shut off from each other in at least one of a liquid-tight state and an air-tight state. For example, in the case where the reaction force chamber is a hydraulic pressure chamber that generates a hydraulic pressure corresponding to a brake operation force, the reaction force chamber is liquid-tightly shut off from the volume chamber. Thus, the hydraulic pressure in the reaction force chamber can be made equal to a magnitude corresponding to the brake operation force, and can be favorably applied to the brake operation member.

(5) The recess may be provided in a front portion of the input piston in a forward opening state. The axial rod portion may be provided in a rear portion of the pressurizing piston. A front end face of a tube portion that forms the recess of the input piston may serve as the operation reaction force receiving face. The recess is provided in the front portion of the input piston, and the axial rod portion is provided in the rear portion of the pressurizing piston.

(6) An intermediate portion of the pressurizing piston may be provided with a large-diameter portion that is larger in diameter than a small-diameter portion as the axial rod portion. The large-diameter portion may be liquid-tightly and slidably fitted to the housing. A space behind a rear end face of a step portion between the large-diameter portion and the small-diameter portion of the pressurizing piston may serve as the back chamber.

(7) The reaction force chamber may serve as a liquid chamber in which hydraulic fluid is accommodated, and constitute part of a stroke simulator, and the operation reaction force receiving face may receive a hydraulic pressure in the reaction force chamber. The stroke simulator is connected to the reaction force chamber. The stroke simulator includes a housing, a piston that is slidably fitted to the housing, a spring that is provided on one side of the piston, and a liquid chamber that is provided on the other side of the piston. The reaction force chamber and the liquid chamber are connected to each other. The reaction force chamber can be considered to be part of the liquid chamber. The hydraulic pressure in each of the liquid chamber and the reaction force chamber becomes equal to a magnitude corresponding to the operation force of the brake operation member. The hydraulic pressure is received by the operation reaction force receiving face, and is applied to the brake operation member.

(8) A spring may be provided in the reaction force chamber between the operation reaction force receiving face and the housing to generate an elastic force in accordance with movements of the input piston relative to the housing. The operation reaction force receiving face receives an elastic force of the spring. The spring is often provided between the input piston and the sleeve as part of the housing. The reaction force chamber can be held in communication with, for example, the atmosphere.

(9) A distance between the axial rod portion and the bottom of the recess may be shorter than a distance between the operation reaction force receiving face and the housing. If the brake operation member is operated, the input piston is advanced. (a) If no hydraulic pressure is supplied to the back chamber and the pressurizing piston is at a retreat end position, the axial rod portion and the bottom of the recess are made to approach each other as the input piston advances. (b) In contrast, if a control pressure is supplied to the back chamber, the pressurizing piston is advanced. The pressurizing piston and the input piston are advanced independently of each other. In this case, if the advance amount of the pressurizing piston is designed to be larger than the advance amount of the input piston, the axial rod portion and the bottom of the recess do not abut on each other. In both these cases (a) and (b), a reaction force is applied to the brake operation member via the operation reaction force receiving face. The operation reaction force receiving face is capable of receiving a force corresponding to an operation force, and the housing and the operation reaction force receiving face are spaced apart from each other. (c) In the case where no control pressure is supplied to the back chamber during an abnormality in the output hydraulic control device or the like, the axial rod portion and the bottom of the recess are brought into abutment on each other due to the advance of the input piston. The pressurizing piston is advanced, and a hydraulic pressure is generated in the front pressurizing chamber. A force corresponding to the hydraulic pressure in the front pressurizing chamber acts on the input piston, and is applied to the brake operation member as a reaction force. In the event of an abnormality in the output hydraulic control device or the like, the distance between the end of the axial rod portion and the bottom of the recess is desired to be short. In consideration of the foregoing circumstances, a distance da between the end of the axial rod portion and the bottom of the recess, and a distance db between the operation reaction force receiving face and the housing in a state in which each of the input piston and the pressurizing piston is at the retreat end position are determined. The former distance da is set shorter than the latter distance db (da<db).

(10) The sleeve may have a cylinder portion having openings at both ends thereof in an axial direction, and a flange portion that is larger in diameter than the cylinder portion. The flange portion may be located behind the pressurizing piston. A space in front of the flange portion may serve as the back chamber.

(11) The sleeve may have a cylinder portion having openings at both ends thereof in an axial direction, and a flange portion that is larger in diameter than the cylinder portion. The flange portion may be located in front of the operation reaction force receiving face of the input piston. A space behind the flange portion may serve as the reaction force chamber. The flange portion of the sleeve is located between the pressurizing piston and the input piston, the space in front of the flange portion serves as the back chamber, and the space behind the flange portion serves as the reaction force chamber.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A hydraulic brake system that includes a cylinder device according to one embodiment of the invention will be described hereinafter in detail on the basis of the drawings. This hydraulic brake system can be mounted on, for example, a hybrid vehicle, an electric vehicle or the like. In a hybrid vehicle, an electric vehicle or the like, a regenerative braking force of an electric motor included in a drive source, and a hydraulic braking force generated by the hydraulic brake system can be applied to wheels. There are cases where only a regenerative braking force is applied to the wheels, where both a regenerative braking force and a hydraulic braking force are applied to the wheels, and where only a hydraulic braking force is applied to the wheels. In the case where only a regenerative braking force is applied to the wheels, even if a brake operation member is operated by a driver, no hydraulic pressure is supplied to a brake cylinder. Besides, this hydraulic brake system can also be mounted on a vehicle that is driven by an engine alone. In that case, the hydraulic pressure in the brake cylinder is controlled through the control of the hydraulic pressure in a back chamber.

Figure 1:
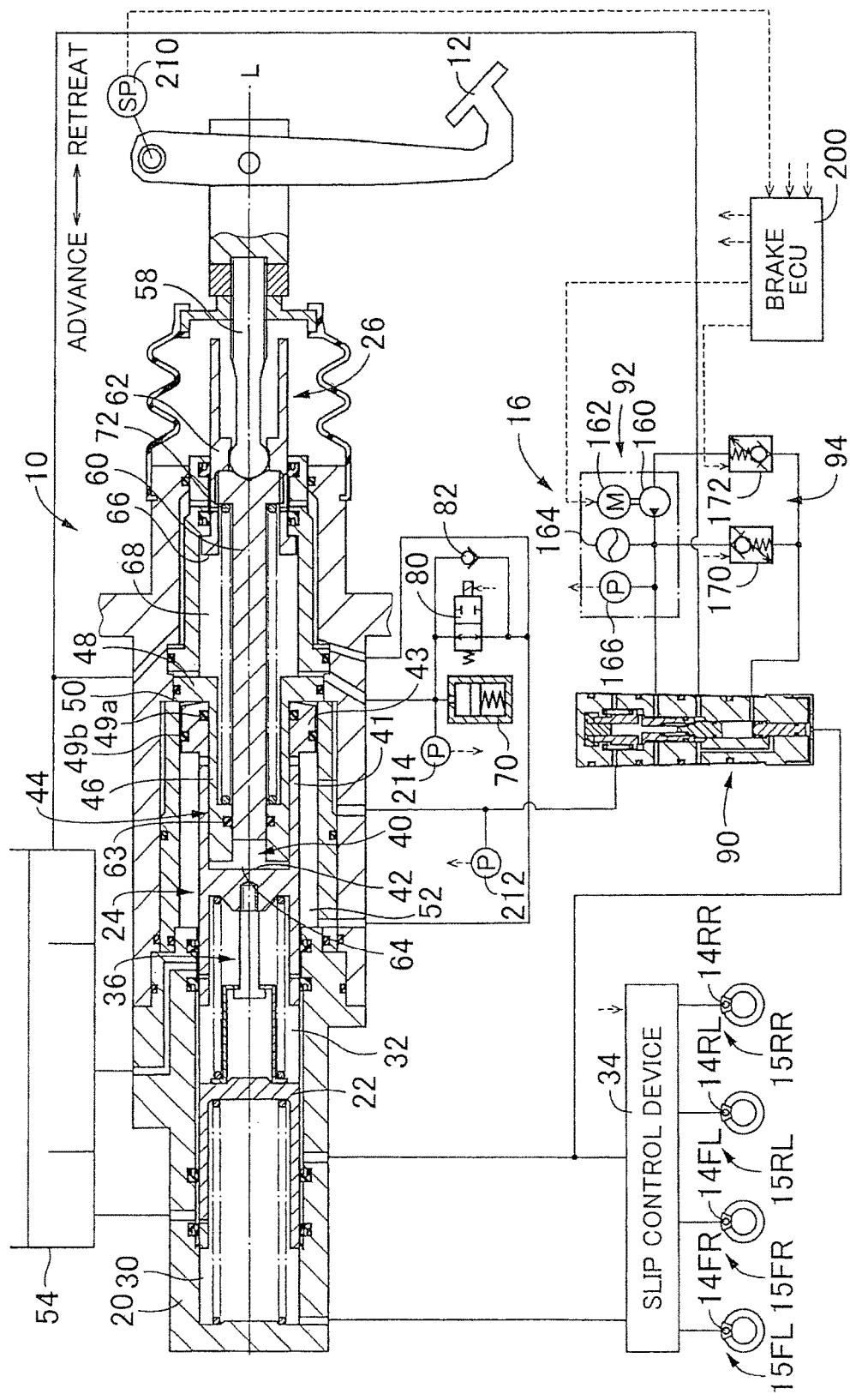
FIG. 1 is a circuit diagram representing a hydraulic brake system in which a cylinder device according to the first embodiment of the invention is included.

In a hydraulic brake system shown in FIG. 1, a brake pedal 12 functions as a brake operation member, and a back hydraulic control device 16 functions as an output hydraulic control device. The cylinder device 10 includes (i) a housing 20, (ii) two pressurizing pistons 22 and 24 that are liquid-tightly and slidably fitted to the housing 20, and (iii) an input piston 26 that is provided coaxially with the pressurizing pistons 22 and 24 (on an axis L) and liquid-tightly and slidably fitted to the housing 20. Spaces in front of the pressurizing pistons 22 and 24 serve as front pressurizing chambers 30 and 32 respectively. The brake cylinders 14FL and 14FR of the hydraulic brakes 15FL and 15FR of the front-left and front-right wheels are connected to the front pressurizing chamber 30, and the brake cylinders 14RL and 14RR of the hydraulic brakes 15RL and 15RR of the rear-left and rear-right wheels are connected to the front pressurizing chamber 32. When a hydraulic pressure is supplied to the brake cylinders 14FL, 14FR, 14RL and 14RR, the hydraulic brakes 15FL, 15FR, 15RL and 15RR are activated to restrain the front-left, front-right, rear-left and rear-right wheels from rotating respectively. A slip control valve device 34 that includes a plurality of electromagnetic on-off valves is provided between the brake cylinders 14FL, 14FR, 14RL and 14RR and the front pressurizing chambers 30 and 32. In the following, in the case where the brake cylinders 14 or the hydraulic brakes 15 need to be distinguished from one another according to the positions of the wheels, they will be accompanied by suffixes (FL, FR, RL and RR) representing the positions of the wheels respectively. In the case where the brake cylinders 14 or the hydraulic brakes 15 do not need to be distinguished from one another, they will be mentioned without being accompanied by suffixes. Incidentally, a spacing limit definition portion 36 is provided between the pressurizing pistons 22 and 24 to define a spacing distance between the pressurizing pistons 22 and 24.

A recess 40 that opens rearward is provided in a rear portion of the pressurizing piston 24. The recess 40 is formed of a tube portion 41 that extends in an axial direction (in the direction of the axis L), and a bottom 42. A flange portion 43 is provided at an end of the tube portion 41 on an opening side (at an end on the other side of the bottom 42) in such a manner as to protrude radially outward. Besides, a sleeve 44 is provided superimposed on the recess 40. The sleeve 44 has a cylinder portion 46 that has openings on both sides thereof in the direction of the axis L, and a flange portion 48 that protrudes radially outward of the cylinder portion 46. The sleeve 44 is disposed in such a posture that the cylinder portion 46 is located inside the recess 40, and that the flange portion 48 is located behind the flange portion 43. The sleeve 44 constitutes part of the housing 20. The sleeve 44 is a fixed member, namely, a member that is prevented from moving in the direction of the axis L. The tube portion 41 of the recess 40 of the pressurizing piston 24 is liquid-tightly and slidably fitted to the outside of the cylinder portion 46 of the sleeve 44 via a sealing portion 49a, and the flange portion 43 of the pressurizing piston 24 is liquid-tightly and slidably fitted to the housing 20 via a sealing portion 49b. As a result, a space between the flange portion 43 of the pressurizing piston 24 and the flange portion 48 of the sleeve 44 serves as a back chamber 50, which is connected to a back hydraulic control device 16. Incidentally, a space in front of the flange portion 43 of the pressurizing piston 24 serves as an annular chamber 52, which is constantly held in communication with a reservoir 54.

The brake pedal 12 is linked with a rear portion of the input piston 26 via an operating rod 58. Besides, a small-diameter rod 60 as an axial rod portion is provided in a front portion of the input piston 26, and a large-diameter portion 62 that is larger in diameter than the small-diameter rod 60 is provided in an intermediate portion of the input piston 26. The small-diameter rod 60 extends to the inside of the recess 40 of the pressurizing piston 24 in the direction of the axis L, and is liquid-tightly and slidably fitted to the cylinder portion 46 of the sleeve 44 via a sealing portion 63, inside the recess 40. A space between a front end face of the small-diameter rod 60 and the bottom 42 of the recess 40 serves as a volume chamber 64. The reservoir 54 is constantly held in communication with the volume chamber 64 via the annular chamber 52. Besides, a front end face 66 of a step portion between the small-diameter rod 60 and the large-diameter portion 62 of the input piston 26 serves as an operation reaction force receiving face, and a space between the operation reaction force receiving face 66 and the flange portion 48 of the sleeve 44 serves as a reaction force chamber 68. A stroke simulator 70 is connected to the reaction force chamber 68. The hydraulic pressure in the reaction force chamber 68 becomes equal to a magnitude corresponding to an advancing force applied to the input piston 26 (an operation force applied to the brake pedal 12), and is applied to the brake pedal 12 as a reaction force via the operation reaction force receiving face 66. Thus, in this embodiment of the invention, the reaction force chamber 68 and the volume chamber 64 are liquid-tightly shut off from each other via the sealing portion 63. The reservoir 54 is connected to the volume chamber 64, and the stroke simulator 70 is connected to the reaction force chamber 68. Since the volume chamber 64 and the reaction force chamber 68 are provided independently of each other, a hydraulic pressure corresponding to a brake operation force can be favorably generated in the reaction force chamber 68 without allowing the reaction force chamber 68 to be influenced by changes in the volume of the volume chamber 64. Besides, the volume chamber 64 is directly connected to the reservoir 54. Therefore, even if the input piston 26 is advanced with respect to the pressurizing piston 24, the advancing force that is applied to the input piston 26 is not transmitted to the pressurizing piston 24. Incidentally, a spring 72 is a return spring that urges the input piston 26 to a retreat end position thereof. Besides, the face of the input piston 26 that retains the spring 72 can also be considered to be part of the operation reaction force receiving face.

The reservoir 54 is connected in parallel with the stroke simulator 70 to the reaction force chamber 68, via an electromagnetic on-off valve 80. The electromagnetic on-off valve 80 is a normally open valve that is open while no current is supplied to a solenoid thereof, and is opened/closed depending on whether a current is supplied to the solenoid or not. With the electromagnetic on-off valve 80 open, the hydraulic pressure in the reaction force chamber 68 is supplied to the reservoir 54, and hence the stroke simulator 70 is deactivated. With the electromagnetic on-off valve 80 closed, the hydraulic pressure in the reaction force chamber 68 is supplied to the stroke simulator 70, whereby the stroke simulator 70 is activated. In this sense, the electromagnetic on-off valve 80 can be referred to as a stroke simulator activation permission/prohibition valve. Besides, a check valve 82 that permits hydraulic fluid to flow from the reservoir 54 to the reaction force chamber 68 and prevents hydraulic fluid from flowing backward is provided in parallel with the electromagnetic on-off valve 80. The check valve 82 favorably avoids the generation of a negative pressure in the reaction force chamber 68.

Figure 2:
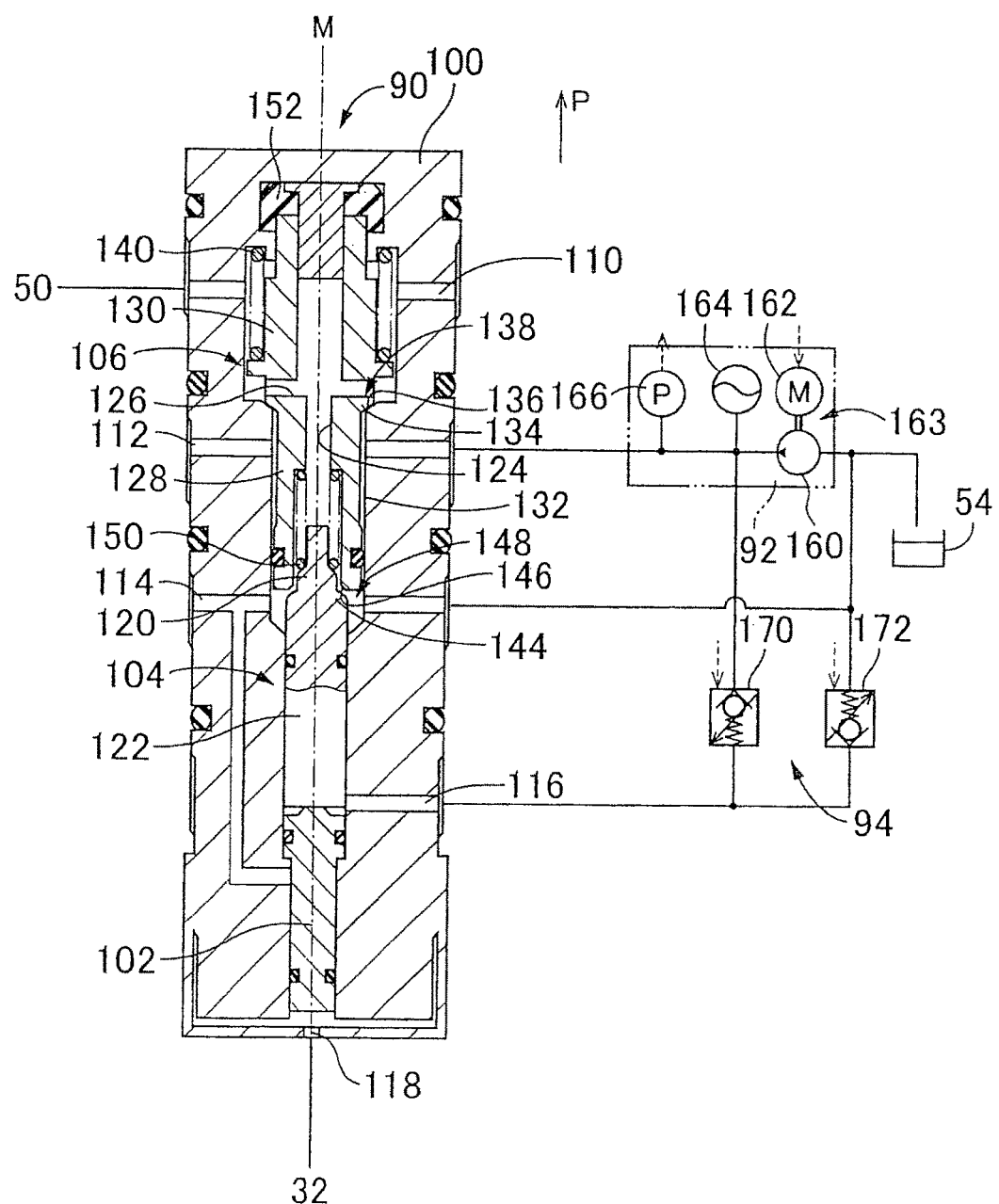
FIG. 2 is a view showing part of the aforementioned hydraulic brake system.

The back hydraulic control device 16 is connected to the back chamber 50. The back hydraulic control device 16 includes a regulator 90, a high-pressure source 92, a linear valve device 94 and the like. The regulator 90 is provided among the back chamber 50, the high-pressure source 92, the linear valve device 94, and the reservoir 54. In the regulator 90, through the use of the hydraulic pressure in the high-pressure source 92 and the hydraulic pressure in the reservoir 54, the output hydraulic pressure is controlled through the control by the linear valve device 94. As shown in FIG. 2, the regulator 90 includes a housing 100, and a plurality of movable members 102 to 106 that are liquid-tightly and slidably fitted in series to the housing 100. The housing 100 is provided with an output port 110 that is connected to the back chamber 50, a high-pressure port 112 that is connected to the high-pressure source 92, a low-pressure port 114 that is connected to the reservoir 54, an input port 116 that is connected to the linear valve device 94, and a pilot port 118 that is connected to the front pressurizing chamber 32. The output port 110, the high-pressure port 112, the low-pressure port 114, the input port 116, and the pilot port 118 are spaced apart from one another in the direction of an axis M.

The movable member 102 is movable due to the hydraulic pressure in the pilot port 118. The movable member 104 assumes a stepped shape having a small-diameter portion 120 and a large-diameter portion 122. An end face of the movable member 104 on the large-diameter portion side serves as a pressure-receiving face that receives the hydraulic pressure in the input port 116, namely, the hydraulic pressure controlled by the linear valve device 94. The movable member 104 is movable due to the hydraulic pressure controlled by the linear valve device 94. The movable member 106 has an axial passage 124 that extends in the axial direction, and an output passage 126 that is held in communication with the output port 110. The axial passage 124 and the output passage 126 are held in communication with each other. Besides, the movable member 106 assumes a stepped shape having a small-diameter portion 128 and a large-diameter portion 130. An annular recess 132 that is provided in an outer peripheral face of the small-diameter portion 128 and extends in the direction of the axis M is held in communication with the high-pressure port 112. A step portion (a valve element) 134 between this small-diameter portion 128 and this large-diameter portion 130, and a step portion (a valve seat) 136 that is provided in the housing 100 constitutes a high-pressure supply valve 138. By opening/closing the high-pressure supply valve 138, the annular recess 132 and the output passage 126 are brought into communication with each other or shut off from each other. The high-pressure supply valve 138 is urged to be closed by a spring 140 that is provided between the movable member 106 and the housing 100. Besides, the small-diameter portion 120 of the movable member 104 is located inside the axial passage 124 of the movable member 106. A step portion (a valve element) 144 between the small-diameter portion 120 and the large-diameter portion 122 of the movable member 104, and an opening edge (a valve seat) 146 of the axial passage 124 of the movable member 106 constitute a low-pressure shutoff valve 148. By opening/closing the low-pressure shutoff valve 148, the low-pressure port 116 and the output port 110 are brought into communication with each other or shut off from each other. The low-pressure shutoff valve 148 is urged to be opened by a spring 150 that is provided between the movable member 104 and the movable member 106. Incidentally, an elastic member 152 is provided between the housing 100 and an end of the movable member 106 on the other side of the movable member 104. The movable member 106 is permitted to move in the direction of an arrow P through elastic deformation of the elastic member 152.

The high-pressure source 92 includes a pump device 163 that is equipped with a pump 160 and a pump motor 162, an accumulator 164, and an accumulator pressure sensor 166 that detects a hydraulic pressure in the accumulator 164. The pump motor 162 is controlled such that the accumulator pressure is held within a set range. The linear valve device 94 includes a pressure-increasing linear valve 170 that is provided between the high-pressure source 92 and the input port 116, and a pressure-reducing linear valve 172 that is provided between the input port 116 and the reservoir 54. Each of the pressure-increasing linear valve 170 and the pressure-reducing linear valve 172 can control the differential pressure thereacross to a magnitude corresponding to the amount of current supplied to a solenoid thereof. The pressure-increasing linear valve 170 is closed when no current is supplied to the solenoid thereof. The pressure-reducing linear valve 172 is open when no current is supplied to the solenoid thereof. The hydraulic pressure in the input port 116 is controlled to a desired magnitude through the control by the pressure-increasing linear valve 170 and the pressure-reducing linear valve 172.

The hydraulic brake system is provided with a brake ECU 200 (see FIG. 1) that is mainly constituted of a computer. The accumulator pressure sensor 166, a stroke sensor 210 that detects an operation stroke of the brake pedal 12, a back hydraulic pressure sensor 212 that detects a hydraulic pressure in the back chamber 50, and a reaction force sensor 214 that detects a hydraulic pressure in the reaction force chamber 68 are connected to the brake ECU 200. Also, the electromagnetic on-off valve 80, the linear valve device 94, the pump motor 162 and the like are connected to the brake ECU 200. The detection value of the reaction force sensor 214 has a magnitude corresponding to the operation force applied to the brake pedal 12. Therefore, the reaction force sensor 214 can be regarded as an operation force sensor as well.

The activation of the hydraulic brake system configured as described above will be described. In the case where the brake pedal 12 has not been operated, in the cylinder device 10, the input piston 26 and the pressurizing pistons 22 and 24 are located at the retreat end positions thereof respectively. The reaction force chamber 68 and the front pressurizing chambers 30 and 32 are held in communication with the reservoir 54, and the hydraulic brake 15 is deactivated. In the back hydraulic control device 16, no current is supplied to the solenoids of the pressure-increasing linear valve 170 and the pressure-reducing linear valve 172, and the regulator 90 is located at an original position shown in FIG. 2. The low-pressure shutoff valve 148 is open, the high-pressure supply valve 138 is closed, and the output port 110 is shut off from the high-pressure port 112 and held in communication with the low-pressure port 114. The back chamber 50 is held in communication with the reservoir 54.

In the case where the hydraulic brake system is normal, regenerative cooperative control is performed. A required braking force intended by a driver is obtained on the basis of detection values of the stroke sensor 210 and the reaction force sensor 214. The hydraulic pressure in the back chamber 50 is then controlled such that the required braking force is fulfilled by at least one of a regenerative braking force and a hydraulic braking force.

In the case where the required braking force is fulfilled by a regenerative braking force, no hydraulic pressure is supplied to the back chamber 50. In the back hydraulic control device 16, no current is supplied to the solenoids of the pressure-increasing linear valve 170 and the pressure-reducing linear valve 172, and the back chamber 50 is held in communication with the reservoir 54. In the cylinder device 10, the electromagnetic on-off valve 80 is closed. Through the operation of the brake pedal 12, the input piston 26 is advanced, the reaction force chamber 68 is shut off from the reservoir 54, and a hydraulic pressure corresponding to the brake operation force is generated. The hydraulic pressure in the reaction force chamber 68 is supplied to the stroke simulator 70, and the stroke simulator 70 is activated. A reaction force corresponding to the hydraulic pressure in the reaction force chamber 68 is applied to the brake pedal 12. Besides, the small-diameter rod 60 of the input piston 26 is advanced with respect to the recess 40 of the pressurizing piston 24. Since the volume chamber 64 is held in communication with the reservoir 54, no hydraulic pressure is generated in the volume chamber 64, and the advancing force that is applied to the input piston 26 is not transmitted to the pressurizing piston 24. No hydraulic pressure is generated in the front pressurizing chambers 30 and 32, no hydraulic pressure is supplied to the brake cylinder 14, and the hydraulic brake 15 is out of operation.

In this case, the sleeve 44 is interposed between the small-diameter rod 60 and the tube portion 41 of the recess 40, and the input piston 26 and the pressurizing piston 24 are not directly slid with respect to each other. Thus, the generation of a frictional force between the input piston 26 and the pressurizing piston 24 is made unlikely, and the pressurizing piston 24 is favorably restrained from advancing as the input piston 26 advances. Besides, the reaction force chamber 68 is provided between the input piston 26 and the housing 20, and the reaction force chamber 68 is liquid-tightly shut off from the volume chamber 64. Thus, the hydraulic pressure in the reaction force chamber 68 can be favorably made equal to a magnitude corresponding to the brake operation force, and the feeling of operation can be improved. On the other hand, in the case where the volume chamber 64 is provided between the front end face of the input piston 26 and the rear end face of the pressurizing piston 24, there is a problem of the prolongation of the total length of the cylinder device 10. In contrast, the small-diameter rod 62 that is provided in the input piston 26 is located inside the recess 40 that is provided in the pressurizing piston 24, and the space between the small-diameter rod 62 and the recess 40 serves as the volume chamber 64. Therefore, there is an advantage in that the total length of the cylinder device 10 can be shortened.

In the case where the regenerative braking force is insufficient to fulfill the required braking force, a hydraulic pressure is supplied to the back chamber 50. In the back hydraulic control device 16, the hydraulic pressure in the input port 116 of the regulator 90 is controlled through the control of the current supplied to the solenoids of the pressure-increasing linear valve 170 and the pressure-reducing linear valve 172. In the regulator 90, the movable member 104 is made to approach the movable member 106 (moved in the direction P), the low-pressure shutoff valve 148 is closed, and the output port 110 is shut off from the low-pressure port 114. Besides, the movable member 106 is moved in the direction P, the high-pressure supply valve 138 is opened, and the output port 110 is brought into communication with the high-pressure port 112. The hydraulic pressure in the output port 110, namely, the hydraulic pressure in the back chamber 50 is controlled to a magnitude corresponding to the hydraulic pressure in the input port 116, and a hydraulic pressure is supplied to the back chamber 50. In the cylinder device 10, the pressurizing pistons 24 and 22 are advanced due to the hydraulic pressure in the back chamber 50. The hydraulic pressure in each of the front pressurizing chambers 30 and 32 is made equal to a magnitude corresponding to the hydraulic pressure in the back chamber 50, and is supplied to the brake cylinder 14. A regenerative braking force and a hydraulic braking force are applied to the wheels, and the hydraulic pressure in the back chamber 50 (the hydraulic braking force) is controlled such that the required braking force is fulfilled by these forces. Besides, the generation of a frictional force between the input piston 26 and the pressurizing piston 24 is made unlikely by the sleeve 44. Therefore, the pressurizing piston 24 is restrained from advancing as the input piston 26 advances as a result of this frictional force, and the hydraulic pressures in the front pressurizing chambers 30 and 32 can be accurately controlled.

In the event of an abnormality in the back hydraulic control device 16 or the like, no current is supplied to the solenoids of the linear valve device 94 and the electromagnetic on-off valve 80. In the cylinder device 10, since the electromagnetic on-off valve is open, the reaction force chamber 68 is held in communication with the reservoir 54. When the brake pedal 12 is operated, the input piston 26 is advanced, the small-diameter rod 62 comes into abutment on the bottom of the recess 40, and the pressurizing pistons 24 and 22 are advanced. A hydraulic pressure corresponding to the brake operation force is generated in each of the front pressurizing chambers 30 and 32. The hydraulic pressure in each of the front pressurizing chambers 30 and 32 is supplied to the brake cylinder 14, and the hydraulic brake 15 is activated. Incidentally, although the stroke simulator 70 is deactivated, a reaction force corresponding to the hydraulic pressure in each of the front pressurizing chambers 30 and 32 is applied to the brake pedal 12. In the back hydraulic control device 16, the hydraulic pressure in the front pressurizing chamber 32 is supplied to the pilot port 118 of the regulator 90. Thus, the movable member 102 is moved in such a manner as to approach the movable member 104 (in the direction P), and the movable member 106 is moved in the direction P. The low-pressure shutoff valve 148 is closed, and the high-pressure supply valve 138 is opened. While a hydraulic pressure is accumulated in the accumulator 164, the hydraulic pressure in the output port 110 is enhanced and supplied to the back chamber 50. An assisting force is applied to the pressurizing piston 24, and the hydraulic pressure in each of the front pressurizing chambers 30 and 32 is enhanced.

Figure 3:
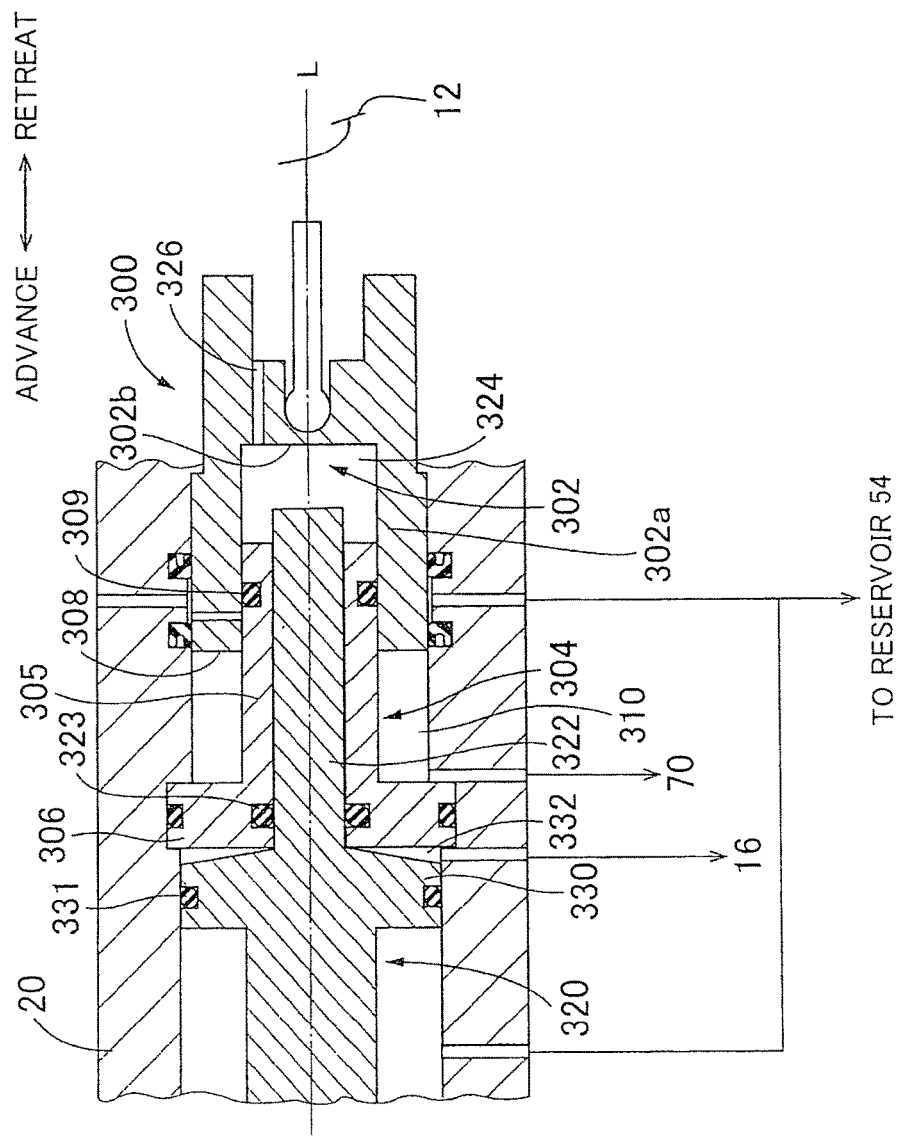
FIG. 3 is a view (a cross-sectional view) showing part of a cylinder device according to the second embodiment of the invention.

In the first embodiment of the invention, the recess is provided in the pressurizing piston. However, the recess can also be provided in the input piston. An example of the recess provided in the input piston is shown in FIG. 3. Other details are the same as in the case of the first embodiment of the invention, and hence the description and depiction thereof is omitted. In a cylinder device of FIG. 3, a recess 302 having a forward opening is provided in a front portion of an input piston 300. Besides, a sleeve 304 is disposed superimposed on the recess 302. The sleeve 304 has a cylinder portion 305 and a flange portion 306. Part of the cylinder portion 305 is located on an inner periphery side of the recess 302 of the input piston 300, and the flange portion 306 is located in front of a front end face 308 of a tube portion 302a that forms the recess 302 of the input piston 300. A space between the front end face 308 of the tube portion 302a and the flange portion 306 serves as a reaction force chamber 310, which is connected to the stroke simulator 70 or the like. Incidentally, the front end face 308 serves as an operation reaction force receiving face, and the tube portion 302a is liquid-tightly, air-tightly and slidably fitted to the outside of the cylinder portion 305 of the sleeve 304 via a sealing portion 309. Besides, the sleeve 304 is prevented from moving in the direction of the axis L, and is fixed.

A small-diameter rod 322 as an axial rod portion is provided in a rear portion of the pressurizing piston 320, and extends to the inside of the recess 302 of the input piston 300 in the direction of the axis L. Besides, the small-diameter rod 322 is air-tightly, liquid-tightly, and slidably fitted to the inside of the tube portion 305 of the sleeve 304 via a sealing portion 323. A space between the small-diameter rod 322 and the bottom 302b of the recess 302 serves as a volume chamber 324, and is held in communication with the atmosphere via an atmospheric passage 326. A large-diameter portion 330 that is larger in diameter than the small-diameter rod 322 is provided in an intermediate portion of the pressurizing piston 320, and the pressurizing piston 320 is liquid-tightly and slidably fitted, at the large-diameter portion 330, to the housing 20 via a sealing portion 331. A space between the large-diameter portion 330 and the flange portion 306 of the sleeve 308 serves as a back chamber 332, which is connected to the back hydraulic control device 16.

In the second embodiment of the invention, the volume chamber 324 and the reaction force chamber 310 are air-tightly and liquid-tightly shut off from each other via the sealing portion 309, the volume chamber 324 is held in communication with the atmosphere, and the reaction force chamber 310 is connected to the stroke simulator 70. As a result, the advancing force that is applied to the input piston 300 can be prevented from being transmitted to the pressurizing piston 320, and the feeling of operation can be improved. Besides, the tube portion 302a and the small-diameter rod 322 are slidably fitted to each other via the sleeve 304. Therefore, the pressurizing piston 320 can be favorably restrained from advancing as the input piston 300 advances as a result of a frictional force between the tube portion 302a and the small-diameter rod 322, and the accuracy in controlling the hydraulic pressure in each of the front pressurizing chambers can be enhanced.

Although the plurality of the embodiments of the invention have been described above, the hydraulic brake system is not limited to the foregoing structures. For example, it is not indispensable that the back hydraulic control device 16 be provided with the regulator 90. The hydraulic pressure in the back chamber 50 can also be controlled through the control by the pump motor 62, the control by the linear valve device 94 or the like. Besides, the regulator 90 may also assume any structure. Besides, the reaction force chamber can be held in communication with the atmosphere, and the spring can also be provided between the operation reaction force receiving face and the housing. A dry-type mechanism may also be employed to apply a reaction force to the brake pedal 12.

The invention claimed is:

1. A cylinder device comprising:
 a housing;
 a pressurizing piston that is liquid-tightly and slidably fitted to the housing;
 an input piston that is disposed coaxially with the pressurizing piston and linked with a brake operation member that is operable by a driver;
 a front pressurizing chamber that is provided in front of the pressurizing piston and connected to a brake cylinder;
 a back chamber that is provided behind the pressurizing piston and connected to an output hydraulic control device that can control an output hydraulic pressure through electric control; and
 a reaction force chamber which is provided between the input piston and the housing located in front of the input piston, and to which an operation reaction force receiving face that receives a force corresponding to an operation force applied to the brake operation member of the input piston is opposed, wherein
 one of the pressurizing piston and the input piston includes a recess that opens toward the other,
 the housing includes a generally tubular sleeve that is at least partially located inside the recess,
 the sleeve has a cylinder portion having openings on both sides thereof in an axial direction, and a flange portion that is larger in diameter than the cylinder portion,
 the flange portion is located behind the pressurizing piston and in front of the input piston,
 a space in front of the flange portion serves as the back chamber,
 the other of the pressurizing piston and the input piston includes an axial rod portion that is slidably fitted to the sleeve in at least one of a liquid-tight state and an air-tight state inside the recess, and
 a space between the axial rod portion and a bottom of the recess serves as a volume chamber whose volume can change in accordance with relative movements between the input piston and the pressurizing piston and which is connected to a low-pressure source or an atmosphere.

2. The cylinder device according to claim 1, wherein the volume chamber constantly communicates with the low-pressure source or the atmosphere.

3. The cylinder device according to claim 1, wherein the recess is provided in a rear portion of the pressurizing piston and is open rearward,
 a front portion of the input piston is provided with a small-diameter portion as the axial rod portion,
 an intermediate portion of the input piston is provided with a large-diameter portion that is larger in diameter than the small-diameter portion, and
 a front end face of a step portion between the small-diameter portion and the large-diameter portion of the input piston serves as the operation reaction force receiving face.

4. The cylinder device according to claim 3, wherein a tube portion forming the recess of the pressurizing piston is slidably fitted to the outside of the sleeve in at least one of a liquid-tight state and an air-tight state, and is liquid-tightly and slidably fitted to the housing,
 the region in the recess of the pressurizing piston that is located behind the rear end face of the tube portion serves as the back chamber.

5. The cylinder device according to claim 1, wherein the recess is provided in a front portion of the input piston and is open forward,
 the axial rod portion is provided in a rear portion of the pressurizing piston, and
 a front end face of a tube portion that forms the recess of the input piston serves as the operation reaction force receiving face.

6. The cylinder device according to claim 5, wherein an intermediate portion of the pressurizing piston is provided with a large-diameter portion that is larger in diameter than a small-diameter portion as the axial rod portion,
 the large-diameter portion is liquid-tightly and slidably fitted to the housing, and
 a space behind a rear end face of a step portion between the large-diameter portion and the small-diameter portion of the pressurizing piston serves as the back chamber.

7. The cylinder device according to claim 1, wherein the reaction force chamber serves as a liquid chamber in which hydraulic fluid is accommodated, and constitutes part of a stroke simulator, and
 the operation reaction force receiving face receives a hydraulic pressure in the reaction force chamber.

8. The cylinder device according to claim 1, further comprising
 a spring that is provided in the reaction force chamber between the operation reaction force receiving face and the housing to generate an elastic force in accordance with movements of the input piston relative to the housing.

9. The cylinder device according to claim 1, wherein a distance between the axial rod portion and the bottom of the recess is shorter than a distance between the operation reaction force receiving face and the housing.

10. The cylinder device according to claim 1, wherein the flange portion is located in front of the operation reaction force receiving face of the input piston, and
 a space behind the flange portion serves as the reaction force chamber.

11. A cylinder device comprising:
 a housing;
 a pressurizing piston that is liquid-tightly and slidably fitted to the housing;

an input piston that is disposed coaxially with the pressurizing piston and linked with a brake operation member that is operable by a driver;
a front pressurizing chamber that is provided in front of the pressurizing piston and connected to a brake cylinder;
a back chamber that is provided behind the pressurizing piston and connected to an output hydraulic control device that can control an output hydraulic pressure through electric control; and
a reaction force chamber which is provided between the input piston and the housing located in front of the input piston, and to which an operation reaction force receiving face that receives a force corresponding to an operation force applied to the brake operation member of the input piston is opposed, wherein
the input piston includes a recess that opens toward the pressurizing piston,
the housing includes a generally tubular sleeve that is at least partially located inside the recess,
both the input piston and the pressurizing piston are movable relative to the sleeve,
the pressurizing piston includes an axial rod portion that is slidably fitted to the sleeve in at least one of a liquid-tight state and an air-tight state inside the recess,
a space between the axial rod portion and a bottom of the recess serves as a volume chamber whose volume can change in accordance with relative movements between the input piston and the pressurizing piston and which is connected to a low-pressure source or an atmosphere,
the recess is provided in a front portion of the input piston and is open forward,
the axial rod portion is provided in a rear portion of the pressurizing piston, and
a front end face of a tube portion that forms the recess of the input piston serves as the operation reaction force receiving face.

12. The cylinder device according to claim 11, wherein
an intermediate portion of the pressurizing piston is provided with a large-diameter portion that is larger in diameter than a small-diameter portion as the axial rod portion,
the large-diameter portion is liquid-tightly and slidably fitted to the housing, and
a space behind a rear end face of a step portion between the large-diameter portion and the small-diameter portion of the pressurizing piston serves as the back chamber.

13. A cylinder device comprising:
a housing;
a pressurizing piston that is liquid-tightly and slidably fitted to the housing;
an input piston that is disposed coaxially with the pressurizing piston and linked with a brake operation member that is operable by a driver;
a front pressurizing chamber that is provided in front of the pressurizing piston and connected to a brake cylinder;
a back chamber that is provided behind the pressurizing piston and connected to an output hydraulic control device that can control an output hydraulic pressure through electric control; and
a reaction force chamber which is provided between the input piston and the housing located in front of the input piston, and to which an operation reaction force receiving face that receives a force corresponding to an operation force applied to the brake operation member of the input piston is opposed, wherein
the input piston includes a recess that opens toward the pressurizing piston,
the housing includes a generally tubular sleeve that is at least partially located inside the recess,
the pressurizing piston includes an axial rod portion that is slidably fitted to the sleeve in at least one of a liquid-tight state and an air-tight state inside the recess,
a space between the axial rod portion and a bottom of the recess serves as a volume chamber whose volume can change in accordance with relative movements between the input piston and the pressurizing piston and which is connected to a low-pressure source or an atmosphere,
the recess is provided in a front portion of the input piston and is open forward,
the axial rod portion is provided in a rear portion of the pressurizing piston,
a front end face of a tube portion that forms the recess of the input piston serves as the operation reaction force receiving face,
an intermediate portion of the pressurizing piston is provided with a large-diameter portion that is larger in diameter than a small-diameter portion as the axial rod portion,
the large-diameter portion is liquid-tightly and slidably fitted to the housing, and
a space behind a rear end face of a step portion between the large-diameter portion and the small-diameter portion of the pressurizing piston serves as the back chamber.

* * * * *